May 21, 1929.  J. W. GOLDHAMER  1,713,696
APPARATUS FOR MANUFACTURING MULTIPLE CONDENSERS
Filed Jan. 18, 1924   2 Sheets-Sheet 1

Inventor
Jacob W. Goldhamer
By Brockett, Hyde & Milburn
Attorneys

May 21, 1929.  J. W. GOLDHAMER  1,713,696
APPARATUS FOR MANUFACTURING MULTIPLE CONDENSERS
Filed Jan. 18, 1924   2 Sheets-Sheet 2
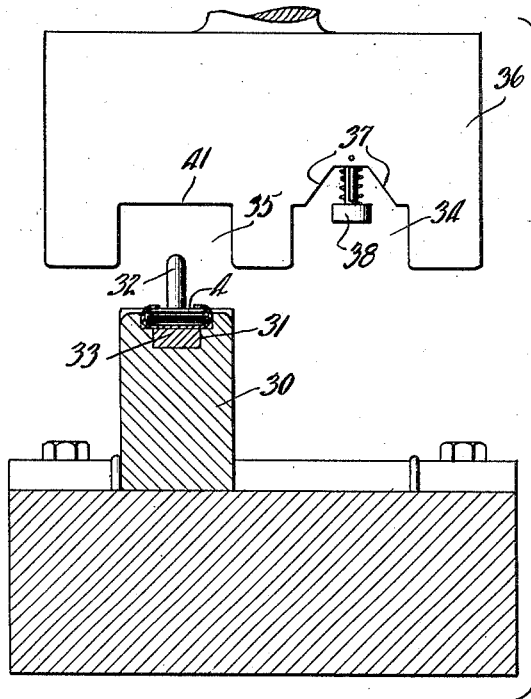
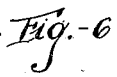
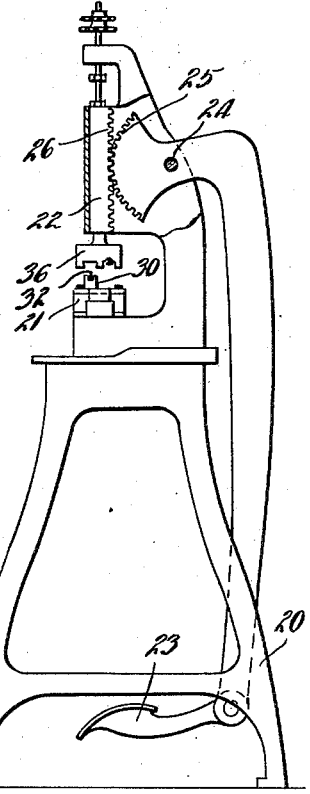
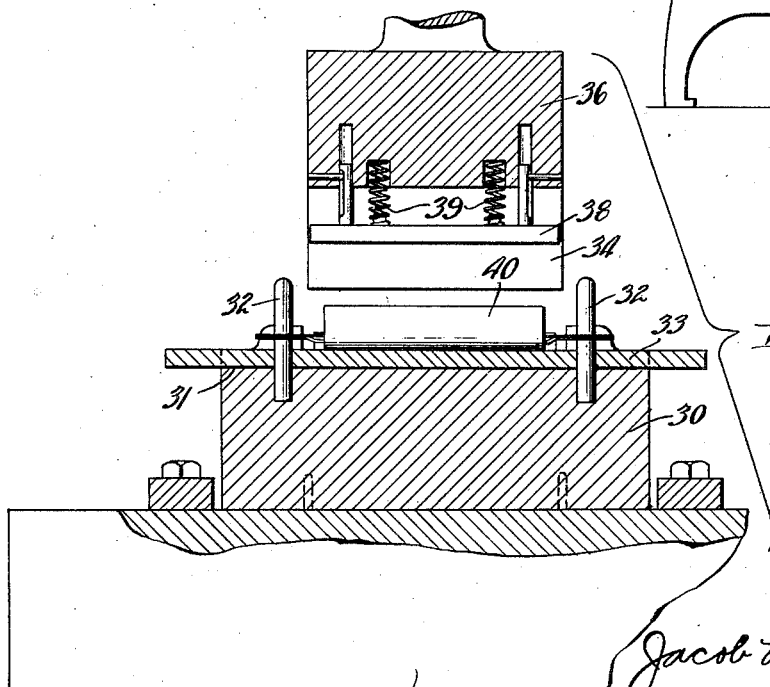
Inventor
Jacob W. Goldhamer
By Brockett, Hyde & Milburn
Attorneys Patented May 21, 1929.

1,713,696

UNITED STATES PATENT OFFICE.

JACOB W. GOLDHAMER, OF CLEVELAND, OHIO.

APPARATUS FOR MANUFACTURING MULTIPLATE CONDENSERS.

Application filed January 18, 1924. Serial No. 687,044.

This invention relates to apparatus for manufacturing multiplate condensers.

The object of the invention is to provide apparatus for manufacturing such condensers, enabling the parts to be readily assembled and secured together with simple apparatus and with a few quite simple operations and therefore at low labor cost, but nevertheless in such manner as to secure uniform product with accurate capacity within reasonable limits.

Further objects of the invention are in part obvious and in part will appear more in detail hereinafter.

Figure 1:
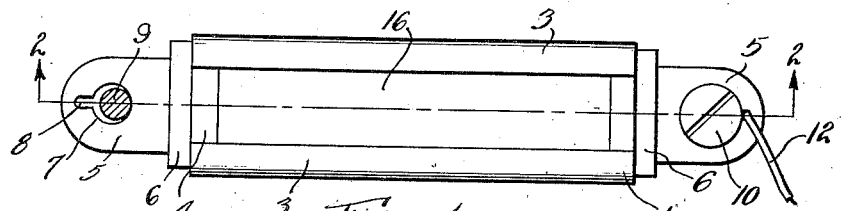
Figure 2:
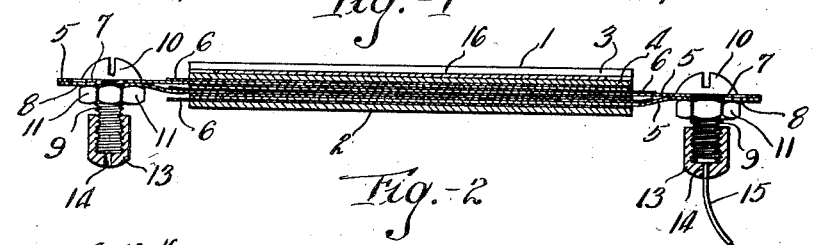
Figure 3:
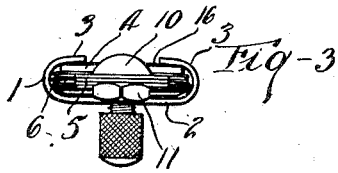
Figure 4:
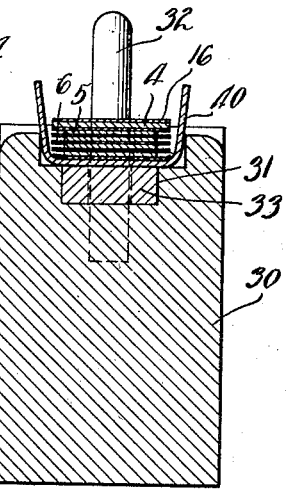
Figure 5:
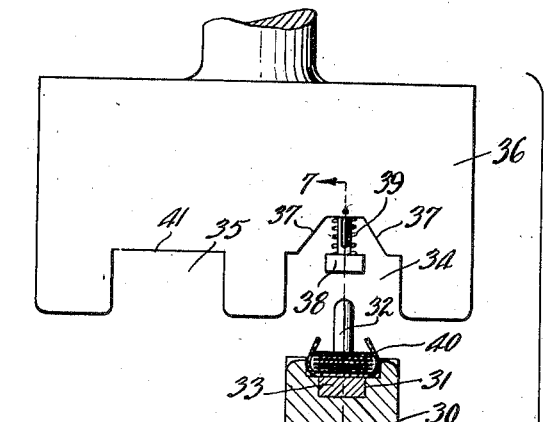
Figure 5:
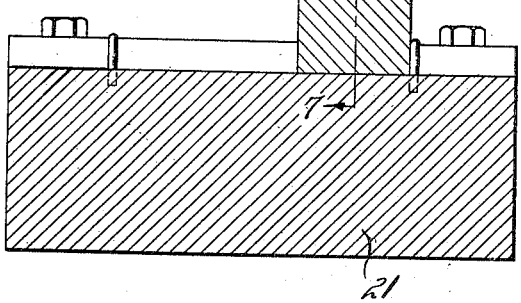

In the drawings, Fig. 1 represents a plan view of a condenser embodying the invention, the parts being somewhat exaggerated and enlarged for clearness of illustration; Fig. 2 is a longitudinal section thereof on the line 2—2, Fig. 1; Fig. 3 is an end view; Fig. 4 is a cross sectional view illustrating assembly of the parts in preparation for the first forming step; Fig. 5 is a similar view after the first forming step and also illustrating the assembly dies; Fig. 6 is a similar view showing the second forming step and dies; Fig. 7 is a sectional elevation on the line 7—7, Fig. 5; and Fig. 8 is an elevation partly broken out and in section, of one suitable machine for manipulating the dies.

Referring first to Figs. 1, 2 and 3, the condenser shown comprises a suitable sheet metal casing or jacket 1, provided with a body 2 and flanges 3 bent parallel with the body over the edges of a similar sheet metal cap or cover 4. In the casing are laid alternating conducting and dielectric strips 5 and 6, such as brass and mica.

The conducting strips project beyond the ends of the casing, half at one end and half at the other, to form current leads, and may be pierced near one end with registering openings 7, having small side extensions 8, the openings being for a binding post 9 having a head 10 on one side and a nut 11 on the other side of the pile and pressing the parts together and securing intimate contact. The extensions 8 are mere notches to receive the wire 12 and enable it to be readily soldered to the leaves or plates. The binding post 9 may also be provided with a second knurled nut 13 having a small central opening 14 for a lead wire 15 to solder it to the binding post.

Although not essential, the condenser may also be readily provided with a suitable label, such as a paper sheet 16, which is laid upon the outer surface of the cap 4 and is exposed to view.

In this condenser, as will appear more fully hereinafter, the superposed layers of alternating conducting and dielectric material are laid in place in a pile with the cap and label on top and are permanently secured in place by bending the flanges 3 of the jacket inwardly and over the edges of the cap and label, the parts being then subjected to flatwise pressure to press the layers into intimate contact and secure uniform spacing between conducting leaves. The parts are thus permanently held by the permanent set placed in the bent metal of the jacket. By subjecting successive condensers to substantially uniform pressure they may be produced with fairly accurate rated capacity within reasonable limits. Nevertheless, condensers may be made with varying capacity by proper changes or selection in the number of leaves or in the thickness of mica, and so on. The flatwise pressure is sufficiently severe to prevent any relative shifting of leaves along their respective planes, and sidewise motion of the conducting leaves, or in other words, motion of such leaves toward the jacket bends or edges is prevented by the pinching action of the jacket metal at the bends, which crowds the mica leaves together and therefore confines each conducting leaf in its own narrow chamber.

The condensers may conveniently be assembled by use of the apparatus shown in Figs. 4 to 8 inclusive. Fig. 8 more or less conventionally illustrates a suitable machine, comprising a frame 20 provided with a bed plate 21 to receive the stationary dies and above which bed is located a head 22 sliding vertically in suitable guides in the frames and suitably actuated by a foot treadle 23, which for example, may be pivoted in the frame at 24 and provided with a toothed segment 25 engaging a rack 26 on the sliding head.

The stationary dies include a block 30 provided with a longitudinal channel 31 and two upwardly extending pins 32 spaced along said channel. In the bottom of said channel is a removable plate 33 having openings to receive said pins and removable by vertical motion along the same. Block 30 is movable or self contained. In other words, it may be slid to various positions upon bed 21 and particularly into position between either one of two cavities 34, 35 in the upper die block 36 carried by the head 22. These two cavities are each of channel form, cavity 34 also having inclined upper wall portions 37 and a yielding presser bar 38 projected into the cavity by springs 39.

In use of this apparatus a blank jacket forming channel member 40 is laid in the die block 30 upon the plate 33 between the pins 32 (Figs. 4 and 7). This channel is selected with its side flanges of proper depth according to the number of layers or leaves in the condenser to be formed. The channels previously are blanked out from sheet metal in any suitable forming machine in the form shown in Fig. 4. The pile of successive dielectric and conducting leaves is then assembled in the channel, by first laying in place a mica leaf, next a conducting leaf, next a mica leaf and so on, with a mica leaf on top. The first conducting leaf 5 is threaded onto one of the pins 32, the second conducting leaf onto the other pin 32, the next conducting leaf onto the first pin 32, and so on alternately. This arrangement provides proper registration between the conducting leaves of each set. When the pile is finished a mica leaf and the cap are laid in place with a label 16 on top. The die block is then moved into position beneath the cavity 34 and the foot treadle is depressed. The upper die block is narrower than the distance between pins 32 (see Fig. 7) and hence moves down between said pins without injuring them. The first action of the closing movement is for the bar 38 to engage the label at the top of the pile and lightly press the several leaves together into temporary close assembled relation. The upper edges of the side flanges of the jacket next engage the inclined walls 37 and at the conclusion of the movement the side flanges are bent partially inward or to the form shown in Fig. 5, such bending movement being sufficient to confine the parts in place with some pressure on the cap plate. The die block is then moved to position beneath the cavity 35 for the second forming step and the foot treadle is again depressed. During this action the upper edges of the side flanges engage the surface 41 and the flanges of the jacket are flattened down to final form, flatwise pressure being also applied to the entire condenser to produce intimate contacting relation between the various conducting and dielectric leaves of the condenser. By applying uniform pressure to successive condensers such condensers are produced with fairly accurate rated capacities.

The inward bending of the side edges of the jacket body member, of course, permanently secures all parts of the condenser together, due to the permanent set produced in the metal. Beyond the point of mere securement however, the flatwise pressure applied to the jacket during the assembling operation, or by a subsequent operation produces additional permanent set in the metal which squeezes the superposed condenser leaves into close relation and so holds them. Short of destruction of the mica or distortion of the conducting leaves, increase in pressure reduces the dielectric gaps and thereby increases condenser capacity. Condenser capacity may be reduced by applying edgewise pressure in the plane of the leaves to the bends in the side edges of the jacket, thereby more or less opening up the jacket and increasing the dielectric spaces between the plates.

When the forming and pressing operations are completed the finished condenser may be removed from the cavity in which it lies by the fingers or any suitable tool. However, to assist in removal of the condenser the removable plate or bar 33 is made longer than the die block in which it lies and its ends may be gripped and said plate moved vertically so that it slides upwardly on pins 32 and ejects the condenser. This operation applies even pressure to the condenser and unthreads the conducting plates from the pins 32 on which there are assembled without bending or injuring these more or less delicate fine metal plates.

Other advantages of the invention will be apparent to those skilled in the art to which it relates.

What I claim is:

1. Apparatus for manufacturing condensers, comprising a die block provided with a cavity adapted to receive condenser parts, stationary pins projecting upwardly from said cavity upon which the conducting condenser leaves are threaded, and cooperating forming dies, said die block being also provided with a removable bottom plate for ejecting said condenser from said cavity.

2. Apparatus for manufacturing condensers, comprising a die block provided with a cavity adapted to receive condenser parts, stationary pins projecting upwardly from said cavity upon which the conducting condenser leaves are threaded, and cooperating forming dies, said die block being also provided with a removable bottom plate for ejecting said condenser from said cavity, said plate being provided with openings and being threaded upon said pins.

In testimony whereof I hereby affix my signature.

JACOB W. GOLDHAMER.